US010343454B2

United States Patent
Nakatsuji et al.

(10) Patent No.: US 10,343,454 B2
(45) Date of Patent: Jul. 9, 2019

(54) BEARING DEVICE FOR VEHICLE WHEEL (71) Applicant: NTN CORPORATION, Osaka (JP)

(72) Inventors: Yuta Nakatsuji, Shizuoka (JP); Natsuko Nagai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/085,375

(22) PCT Filed: Mar. 16, 2017

(86) PCT No.: PCT/JP2017/010730
§ 371 (c)(1),
(2) Date: Sep. 14, 2018

(87) PCT Pub. No.: WO2017/159804
PCT Pub. Date: Sep. 21, 2017

(65) Prior Publication Data
US 2019/0084350 A1 Mar. 21, 2019

(30) Foreign Application Priority Data
Mar. 18, 2016 (JP) ................................. 2016-055966

(51) Int. Cl.
*F16C 41/00* (2006.01)
*B60B 35/02* (2006.01)
(Continued)

(52) U.S. Cl.
CPC ............. *B60B 35/02* (2013.01); *F16C 19/18* (2013.01); *F16C 19/38* (2013.01); *F16C 33/66* (2013.01);
(Continued)

(58) Field of Classification Search
CPC ........ F16C 33/66; F16C 33/80; F16C 41/007; B60B 35/02
See application file for complete search history.

(56) References Cited

U.S. PATENT DOCUMENTS 6,217,220 B1 4/2001 Ohkuma et al.
9,259,964 B2 * 2/2016 Mock .................. B60B 27/0068
(Continued)

FOREIGN PATENT DOCUMENTS

EP 0905394 A2 * 3/1999 ............ F16C 19/386
JP 2000-198304 7/2000
(Continued)

OTHER PUBLICATIONS

International Search Report dated Jun. 20, 2017 in International (PCT) Application No. PCT/JP2017/010730.

*Primary Examiner* — Thomas R Hannon
(74) *Attorney, Agent, or Firm* — Wenderoth, Lind & Ponack, L.L.P.

(57) ABSTRACT

A bearing device for a vehicle wheel (1) includes: an outer ring (2), serving as an outer member; an inner member in which the inner member including a hub ring (3) that has an integral wheel mounting flange (3B) to which a wheel is mounted, and at least one inner ring (4) that is press-fitted to a small-diameter step part (3A) of the hub ring; ball rows (5) that are accommodated in a freely rolling manner; and a bottomed-tube-shaped cover (11) fitted to an inner-side opening (2B) of the outer member. In order to retain grease enclosed between the outer member and the inner member near the ball rows, an outside damming member (11D), which is formed of a ring-shaped elastic body extending radially inward, is provided at a side (11A) of the cover.

16 Claims, 6 Drawing Sheets

(51) Int. Cl.
*F16C 19/18* (2006.01)
*F16C 19/38* (2006.01)
*F16C 33/66* (2006.01)
*F16J 15/3204* (2016.01)
*F16C 33/80* (2006.01)

(52) U.S. Cl.
CPC .............. *F16C 33/80* (2013.01); *F16C 41/00* (2013.01); *F16J 15/3204* (2013.01); *B60B 2310/30* (2013.01); *F16C 2326/02* (2013.01)

(56) References Cited

U.S. PATENT DOCUMENTS

| | | | |
|---|---|---|---|
| 9,752,622 B2* | 9/2017 | Takanashi | F16C 33/723 |
| 10,099,509 B2* | 10/2018 | Konishi | G01P 3/487 |

FOREIGN PATENT DOCUMENTS

| | | |
|---|---|---|
| JP | 2000-249138 | 9/2000 |
| JP | 2010-031994 | 2/2010 |
| JP | 2011-058522 | 3/2011 |
| JP | 2011-208702 | 10/2011 |

* cited by examiner

BEARING DEVICE FOR VEHICLE WHEEL

TECHNICAL FIELD

The present invention relates to a bearing device for a vehicle wheel.

BACKGROUND ART

Conventionally, there is known a bearing device for a vehicle wheel that rotatably supports a wheel in a suspension system of an automobile or the like, and includes a rotational speed detecting device that detects the rotational speed of the wheel. In the bearing device, a hub wheel to be connected to a wheel is rotatably supported via rolling elements. The rotational speed detecting device of the bearing device is configured of a magnetic encoder in which different magnetic poles are alternately magnetized in the circumferential direction, and a magnetic sensor. In the bearing device, the magnetic encoder is fixed to the hub wheel, and the magnetic sensor is disposed at a portion where it does not rotate along with the hub wheel. The bearing device can detect the rotational speed of the wheel connected to the hub wheel from intervals of changes in the magnetism when the magnetic encoder, rotating along with the hub wheel, passes near the magnetic sensor.

As a bearing device for a vehicle wheel of such a type, there is one in which a magnetic encoder is protected by a cover in order to prevent erroneous detection due to a damage by flying stones or the like, or adhesion of mud, magnetic material, and the like, to the magnetic encoder of the rotational speed detecting device. The magnetic encoder is hermetically sealed inside the outer ring in such a manner that the opening of the outer ring of the bearing device is covered with a nonmagnetic cover. With this configuration, the bearing device can detect a change in the magnetic properties of the magnetic encoder by the magnetic sensor while protecting the magnetic encoder from flying stones and mud. For example, Patent Literature 1 describes as provided below.

A rolling bearing unit with an encoder (bearing device for a vehicle wheel) described in Patent Literature 1 includes an outer ring (outer member), a hub body (inner member), a cover, and an encoder. Inside the outer ring, the hub body is rotatably supported via rolling elements. In the vicinity of the rolling elements, grease for lubrication between the rolling elements and the hub body and between the rolling elements and the outer ring is injected. To one side end of the hub body, an encoder is fixed via a support ring (support ring). A bottomed cylindrical cover is fitted to the opening of the outer ring facing the detection surface of the encoder. The rolling bearing unit with the encoder is attached to a knuckle of a wheel suspension system, and a magnetic sensor (not illustrated) that rotates the encoder is supported by the knuckle.

The cover is formed such that a cylindrical portion (side portion), an outer diameter side flat plate which is a disk-shaped bottom face, and an inner diameter side flat plate are integrated via a connecting plate. Thereby, the cover of the rolling bearing unit with the encoder encloses the grease and the encoder therein with the cover and prevents mud and foreign materials from entering the grease and the like, and also protects the encoder from mud, a magnetic material, and the like. However, in the rolling bearing unit with the encoder, a space for installing the encoder is formed on the outer side (inner side) from the rolling element. Therefore, there is a possibility that the grease sealed in the vicinity of the rolling element is scraped out by the rotation of the rolling element and flows out to the space where the encoder is provided. Therefore, in the rolling bearing unit with the encoder, it is necessary to enclose the grease in consideration of the amount of grease outflow into the space where the encoder is installed.

CITATION LIST

Patent Literature

Patent Literature 1: JP-A 2011-208702 Gazette

SUMMARY OF INVENTION

Technical Problems

The present invention has been made in view of the above circumstances. An object of the present invention is to provide a bearing device for a vehicle wheel capable of suppressing outflow of grease from the vicinity of rolling elements and reducing the enclosed amount of grease.

Solutions to Problems

A bearing device for a vehicle wheel according to an aspect of the present invention includes: an outer member in which double-row outer rolling surfaces are integrally formed on an inner periphery of the outer member; an inner member including a hub wheel and at least one inner ring and having double-row inner rolling surfaces facing the double-row outer rolling surfaces on an outer periphery of the inner member, the hub wheel having a wheel mounting flange, integrally formed, for attaching a wheel at one end of the hub wheel and having a small diameter stepped portion extending axially on an outer periphery of the hub wheel, the inner ring being press-fitted to the small diameter stepped portion of the hub wheel; double-row rolling elements rotatably accommodated between a rolling surface of the inner member and a rolling surface of the outer member; a magnetic encoder provided at an end on an inner side of the inner member; and a bottomed cylindrical cover fitted to an opening on an inner side of the outer member so as to face the magnetic encoder. The bearing device includes an outer blocking member formed of an annular elastic body extending radially inward at a side portion of the cover so as to retain a lubricant enclosed between the outer member and the inner member in the vicinity of the rolling elements.

In the bearing device according to an aspect of the present invention, it is preferable that the outer blocking member is provided on an axial end face of the side portion of the cover radially inside relative to an outer peripheral surface of the side portion, and that a contact portion with the outer member is formed to protrude axially.

In the bearing device according to an aspect of the present invention, it is preferable that the outer blocking member is configured to overlap a fitting portion of a support ring that is fitted to an end portion on the inner side of the inner member and supports the magnetic encoder, in an axial view.

In the bearing device according to an aspect of the present invention, in order to retain the lubricant enclosed between the outer member and the inner member in the vicinity of the rolling elements, it is preferable that an inner blocking member, which is in an annular shape and extends radially outward from the entire periphery of an end portion of the fitting portion of the support ring, is provided to face the outer blocking member.

In the bearing device according to an aspect of the present invention, it is preferable that the inner blocking member is formed of an annular elastic body extending radially outward from the end portion of the fitting portion of the support ring.

In the bearing device according to an aspect of the present invention, it is preferable that the inner blocking member is formed such that the end portion of the fitting portion of the support ring is bent radially outward.

Advantageous Effects of Invention

According to the bearing device of the present invention, the outer blocking member made of an elastic body is disposed between the rolling element and the cover. Therefore, even if the lubricant is scraped out from the vicinity of the rolling element to the cover side due to rolling of the rolling element, it is blocked by the outer blocking member. Thereby, it is possible to suppress the outflow of the grease from the vicinity of the rolling element and to reduce the enclosed amount of the grease.

According to the bearing device of the present invention, the space in the vicinity of the rolling element into which the lubricant is injected is reduced. In addition, the gap between the outer member and the cover is sealed without interrupting the fitting of the cover. Thereby, it is possible to suppress the outflow of the grease from the vicinity of the rolling element and to reduce the enclosed amount of the grease.

According to the bearing device of the present invention, the fitting portion of the support ring supporting the encoder is utilized to increase the passage resistance when the lubricant passes through the gap formed by the outer blocking member. Thereby, it is possible to suppress the outflow of the grease from the vicinity of the rolling element and to reduce the enclosed amount of the grease.

According to the bearing device of the present invention, the outer blocking member and the inner blocking member are provided closely to each other. Accordingly, a labyrinth is formed by the outer blocking member and the inner blocking member in the gap between the outer blocking member and the inner member. Thereby, it is possible to suppress the outflow of the grease from the vicinity of the rolling element and to reduce the enclosed amount of the grease.

According to the bearing device of the present invention, even if a centrifugal force is applied to the inner blocking member by the rotation of the inner member, the positional relationship with the outer blocking member is maintained. Thereby, it is possible to suppress the outflow of the grease from the vicinity of the rolling element and to reduce the enclosed amount of the grease.

DESCRIPTION OF EMBODIMENTS

Hereinafter, with reference to FIGS. 1 and 2, a bearing device for a vehicle wheel 1 as a first embodiment of a bearing device for a vehicle wheel will be described.

Figure 1:
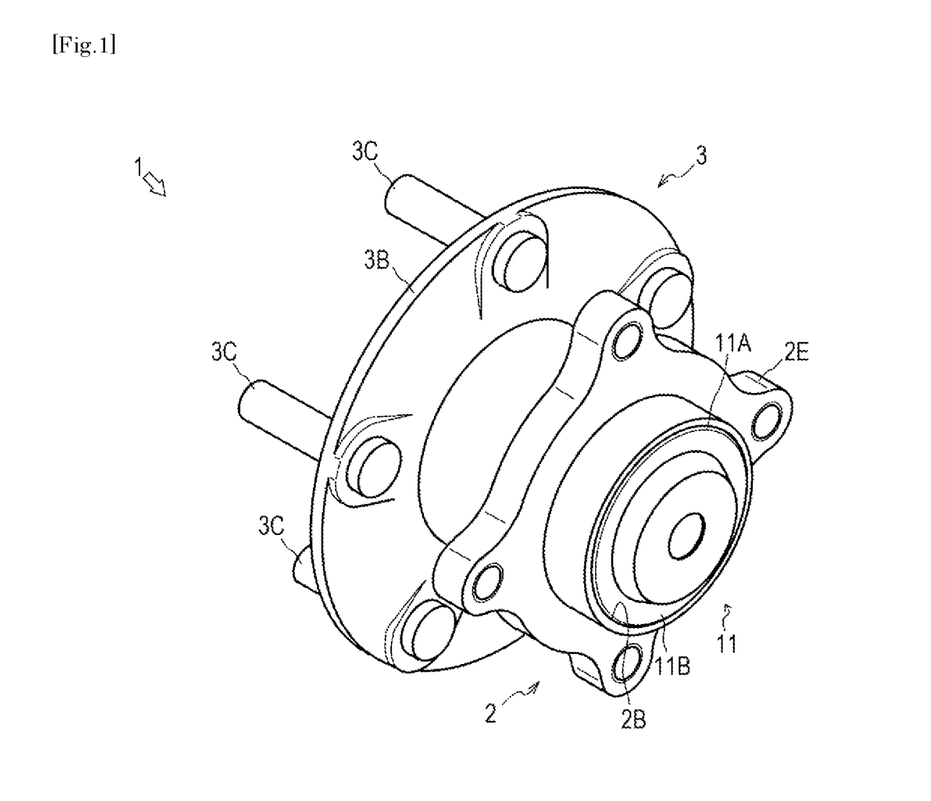
FIG. 1 is a perspective view illustrating an entire configuration according to a first embodiment of a bearing device for a vehicle wheel.

As illustrated in FIG. 1, the bearing device 1 rotatably supports a wheel in a suspension system of a vehicle such as an automobile. The bearing device 1 includes an outer ring 2, a hub wheel 3, an inner ring 4 (see FIG. 2), two ball rows 5 that are rolling elements (see FIG. 2), a rotational speed detecting device 6 (see FIG. 2), a support ring 8 (see FIG. 2), a seal member 10 (see FIG. 2), and a cover 11.

Figure 2A:
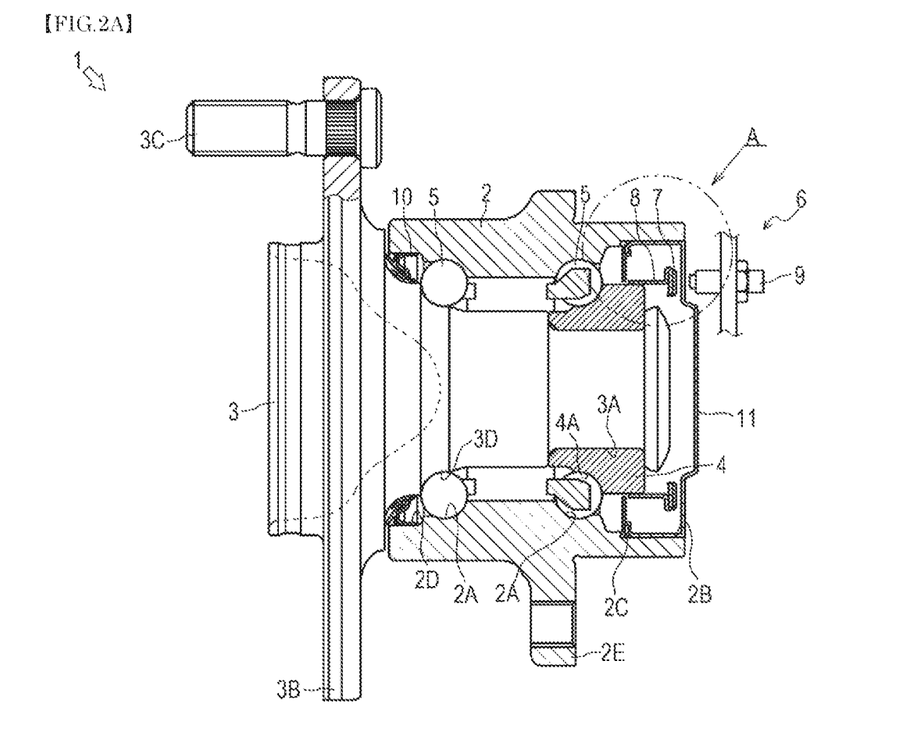
FIG. 2A is an end view illustrating the entire configuration according to the first embodiment of the bearing device.

As illustrated in FIG. 2A, the outer ring 2 as an outer member supports the hub wheel 3 and the inner ring 4. The outer ring 2 is formed in a substantially cylindrical shape, and is made of medium to high carbon steel containing 0.40 to 0.80 wt % of carbon such as S53C. On the inner peripheral surface of the outer ring 2, annular outer rolling surfaces 2A are formed in the circumferential direction so as to be parallel to one side (inner side) and the other side (outer side). Each of the outer rolling surfaces 2A and 2A has a hardened layer formed to have a surface hardness ranging from 58 to 64 HRC by induction hardening. One side end (inner side) of the outer ring 2 has a one side opening 2B into which the cover 11 can be fitted. The one side opening 2B has a stepped portion 2C for setting a fitting position of the cover 11 (see FIG. 2B). The other end (outer side) of the outer ring 2 has the other side opening 2D into which the seal member 10 can be fitted. On the outer peripheral surface of the outer ring 2, a vehicle body mounting flange 2E to be attached to a knuckle of the suspension system (not illustrated) is integrally formed.

The hub wheel 3, which is a part of the inner member, rotatably supports a wheel of a vehicle (not illustrated). The hub wheel 3 is formed in a bottomed cylindrical shape, and is made of medium and high carbon steel including 0.40 to 0.80 wt % of carbon such as S53C. One side end (inner side) of the hub wheel 3 has a small diameter stepped portion 3A reduced in diameter on the outer peripheral surface. On the other side end (outer side) which is one end portion of the hub wheel 3, a wheel mounting flange 3B for attaching the wheel is integrally formed. The wheel mounting flange 3B is provided with hub bolts 3C at circumferentially equalized positions. The outer peripheral surface on the other side of the hub wheel 3 has an annular inner rolling surface 3D in the circumferential direction.

To the small diameter stepped portion 3A at the one side end of the hub wheel 3, an inner ring 4 that is a part of the inner member is press-fitted. The inner member is configured of the hub wheel 3 and the inner ring 4. The inner ring 4 is made of a high carbon chromium bearing steel such as SUJ2, and has been hardened in a range from 58 to 64 HRC up to the core portion by sub-quenching. The outer peripheral surface of the inner ring 4 has an annular inner rolling surface 4A formed in the circumferential direction. The inner ring 4 is formed integrally with the one side end of the hub wheel 3 in a state where the one side end of the hub wheel 3 is plastically deformed (crimped) radially outward whereby a predetermined preload is applied thereto. That is, on one side of the hub wheel 3, the inner rolling surface 4A is formed by the inner ring 4. The hub wheel 3 is hardened from the small diameter stepped portion 3A on one side to the inner rolling surface 3D on the other side by induction hardening to have a surface hardness ranging from 58 to 64 HRC. Thereby, the hub wheel 3 has sufficient mechanical strength against the rotational bending load applied to the wheel mounting flange 3B, and the durability of the hub wheel 3 is improved. It should be noted that the surface hardness of the crimped portion on one side end remains that after forging. The hub wheel 3 is disposed such that the inner rolling surface 4A formed on the inner ring 4 at one side end faces the outer rolling surface 2A on one side of the outer ring 2, and the inner rolling surface 3D formed on the other side faces the outer rolling surface 2A on the other side of the outer ring 2.

Two ball rows 5 which are rolling elements rotatably support the hub wheel 3. In the two ball rows 5, a plurality of balls are annularly held by a retainer. The two ball rows 5 are made of high carbon chromium bearing steel such as SUJ2, and are hardened in a range from 58 to 64 HRC up to the core portion by sub-quenching. One ball row 5 out of the two ball rows 5 is rotatably interposed between the inner rolling surface 4A formed on the inner ring 4 and the outer rolling surface 2A on one side of the outer ring 2 opposed thereto. The other ball row 5 out of the two ball rows 5 is rotatably interposed between the inner rolling surface 3D formed on the hub wheel 3 and the outer rolling surface 2A on the other side of the outer ring 2 opposed thereto. That is, the two ball rows 5 rotatably support the hub wheel 3 and the inner ring 4 with respect to the outer ring 2. As described above, in the bearing device 1, double-row angular contact ball bearings are configured of the outer ring 2, the hub wheel 3, the inner ring 4, and the two ball rows 5. In the present embodiment, double-row angular contact ball bearings are formed in the bearing device 1. However, the present invention is not limited thereto, and double-row tapered roller bearings or the like may be formed.

The rotational speed detecting device 6 detects rotational speed around the axis of the hub wheel 3 and the inner ring 4. The rotational speed detecting device 6 is configured of an encoder including a magnetic encoder 7 and a magnetic sensor 9.

Figure 2B:
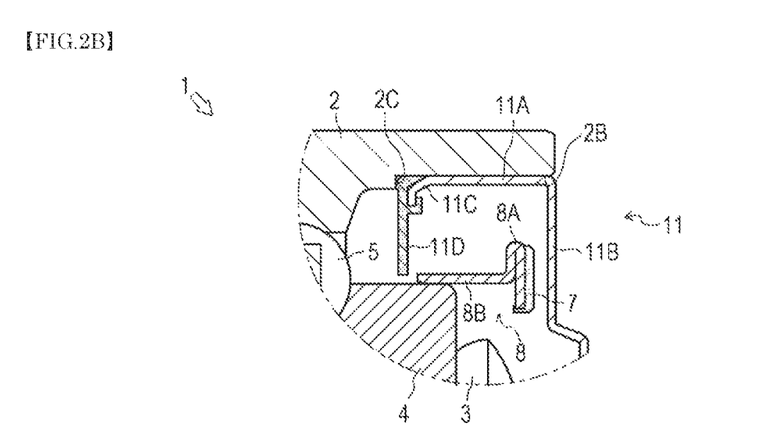
FIG. 2B is an enlarged end view illustrating a part A in FIG. 2A.

As illustrated in FIG. 2B, in the magnetic encoder 7, synthetic rubber in which magnetic powder such as ferrite is mixed is annularly formed and is magnetized to have a magnetic pole N and a magnetic pole S at an equal pitch in the circumferential direction. The magnetic encoder 7 is integrally joined to a flange portion 8A of the support ring 8 by vulcanization adhesion. The magnetic encoder 7 is disposed in the one side opening 2B of the outer ring 2 via the support ring 8 fitted to the inner ring 4. That is, the magnetic encoder 7 is configured to be rotatable integrally with the hub wheel 3 via the support ring 8 and the inner ring 4.

The support ring 8 supports the magnetic encoder 7. The support ring 8 is a cylindrical member in which the flange portion 8A is formed at one side end thereof. The outer diameter of the flange portion 8A is larger than the outer diameter of the cylindrical portion 8B at the other side end. The magnetic encoder 7 is integrally joined to the flange portion 8A of the support ring 8 by vulcanization adhesion. The cylindrical portion 8B of the support ring 8 is fitted to the inner ring 4 as a fitting portion. The support ring 8 is made of a ferromagnetic steel sheet for improving the rust prevention property and the stability of the detection accuracy, namely, a ferritic stainless steel sheet (SUS430 series or the like of JIS standard) or a rust-proof cold rolled steel sheet (SPCC series or the like of JIS standard), for example, and is formed by press working. In the present embodiment, the flange portion 8A of the support ring 8 extends radially outward to have an outer diameter larger than that of the cylindrical portion 8B. However, the present invention is not limited thereto, and the flange portion 8A may extend radially inward to have an outer diameter smaller than that of the cylindrical portion 8B.

As illustrated in FIG. 2A, the magnetic sensor 9 detects magnetism of the magnetic encoder 7. The magnetic sensor 9 is attached to the outer ring 2 and a knuckle of the suspension system (not illustrated) such that the detection surface of the magnetic sensor 9 faces the magnetic encoder 7 by a sensor holder. The magnetic sensor 9 is disposed so as to have a predetermined air gap (axial clearance) from the magnetic encoder 7. The magnetic sensor 9 detects the passage time of each magnetism of the magnetic encoder 7 alternately passing through the detection surface by being rotated integrally with the hub wheel 3.

The seal member 10 closes a gap between the outer ring 2 and the hub wheel 3. The seal member 10 is made of synthetic rubber such as nitrile rubber, and is integrally joined to the support ring 8 formed in a substantially cylindrical shape by vulcanization adhesion. The seal member 10 has a plurality of lips formed inside. In the seal member 10, the cylindrical portion 8B is fitted to the other side opening 2D (outer side) of the outer ring 2, and a plurality of the lips are in contact with the outer peripheral surface of the hub wheel 3. The lip of the seal member 10 is configured to be slidable via an oil film formed between the outer peripheral surface of the hub wheel 3 and the lip. Thereby, the seal member 10 seals the grease GR inside the bearing and prevents entry of rainwater, dust, and the like from the outside.

As illustrated in FIG. 2B, the cover 11 covers one side (inner side) opening 2B of the outer ring 2 to protect the magnetic encoder 7. The cover 11 is formed in a bottomed cylindrical shape by press working, and is made of a nonmagnetic austenitic stainless steel plate (SUS304 series or the like of JIS standard). In the cover 11, a cylindrical side portion 11A and a disk-shaped bottom portion 11B with a protruding center portion are integrally connected. The side portion 11A is formed to have an outer diameter slightly larger than the inner diameter of the one side opening 2B of the outer ring 2. The axial end portion of the side portion 11A has an outer adhesion portion 11C bent radially inward in a tapered manner over the entire circumference. The outer adhesion portion 11C is integrally provided with an annular outer blocking member 11D formed of a synthetic rubber plate such as a nitrile rubber or the like which is an elastic body, by vulcanization adhesion. The outer blocking member 11D is provided so as to extend radially inward from the entire periphery of the outer adhesion portion 11C.

In the cover 11, the side portion 11A is fitted to the one side opening 2B of the outer ring 2. In the cover 11, the side portion 11A is inserted into the one side opening 2B. The cover 11 is fitted to a predetermined position when the axial end face of the side portion 11A is brought into contact with the stepped portion 2C of the one side opening 2B. The outer blocking member 11D of the cover 11 fitted to a predetermined position is arranged so as to partition the ball row 5 and the magnetic encoder 7 in the vicinity of the ball row 5. The cover 11 closes the one side opening 2B of the outer ring 2 when the side portion 11A is fitted to the outer ring 2. As a result, the cover 11 encloses the grease GR, which is injected in the vicinity of the ball row 5 disposed in the vicinity of the one side opening 2B, inside the outer ring 2, and protects the magnetic encoder 7. In order to prevent damage at the time of press-fitting, the outer blocking member 11D is formed such that the compression rate of the deformation allowance G is less than 45%, due to workability at the time of press-fitting, material properties, and the like.

In the bearing device 1 configured as described above, double-row angular contact ball bearings are configured of the outer ring 2, the hub wheel 3, the inner ring 4, and the two ball rows 5, and the hub wheel 3 is rotatably supported by the outer ring 2 via the two ball rows 5. Further, in the bearing device 1, the magnetic encoder 7 is fixed to the hub wheel 3 and is protected by the cover 11. In the bearing device 1, a change in magnetism of the magnetic encoder 7 rotating integrally with the hub wheel 3 is detected by the magnetic sensor 9 fixed to the outer ring 2.

Next, the outer blocking member 11D of the cover 11 will be described in detail with reference to FIGS. 3 to 6.

Figure 3:
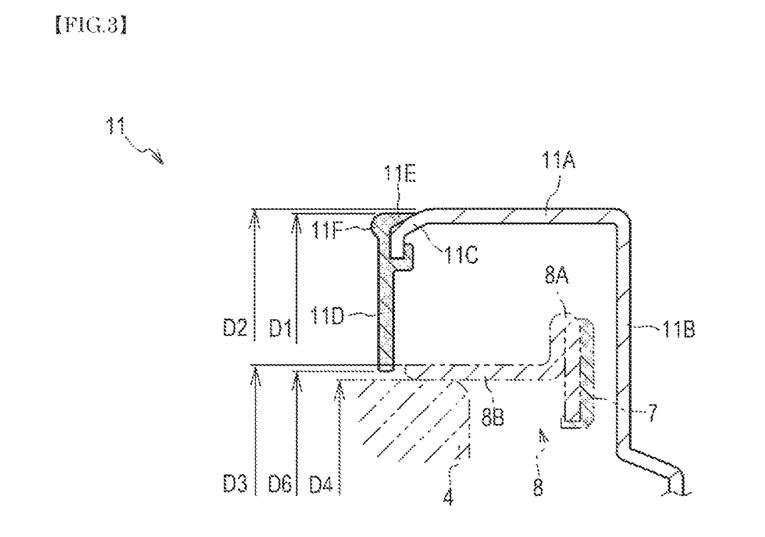
FIG. 3 is an enlarged cross-sectional view illustrating an outer blocking member of a cover, according to the first embodiment of the bearing device.

As illustrated in FIG. 3, on the outer blocking member 11D, an annular radial seal portion 11E in which synthetic rubber is injected is integrally formed along the entire circumference of the tapered portion of the outer adhesion portion 11C. Further, on the outer blocking member 11D, an annular axial seal portion 11F protruding axially is integrally formed along the entire circumference. That is, the radial seal portion 11E and the axial seal portion 11F are integrally formed as a part of the outer blocking member 11D. The outer blocking member 11D is formed such that the outer diameter D1 of the radial seal portion 11E forming the outer shape thereof is smaller than the outer diameter D2 of the side portion 11A. Further, the outer blocking member 11D is formed such that the inner diameter D6 thereof is smaller than the outer diameter D3 of the cylindrical portion 8B of the support ring 8 and is larger than the outer diameter D4 of the inner ring 4.

Figure 4:
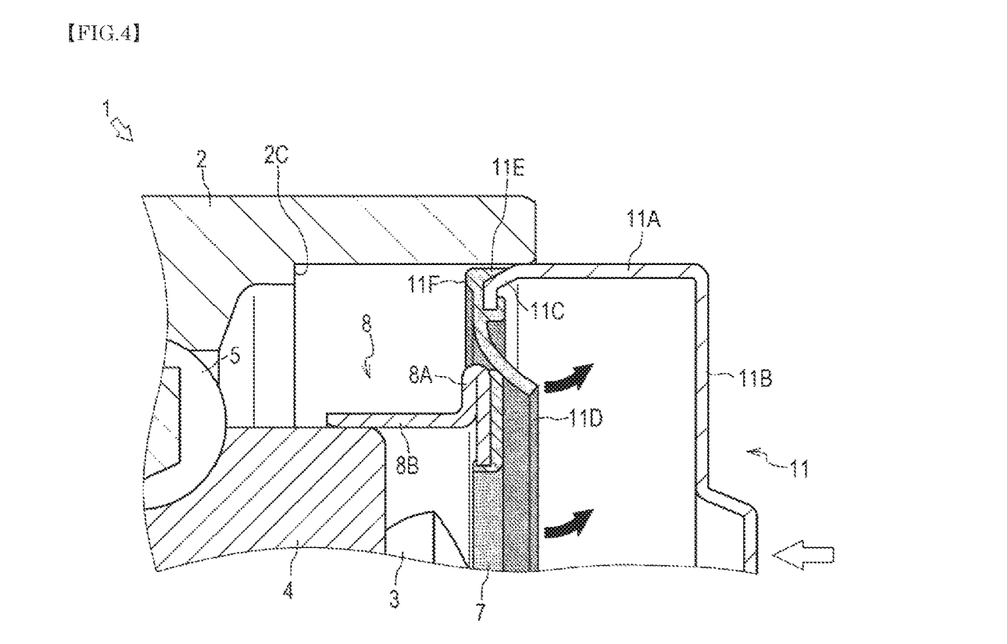
FIG. 4 is an enlarged cross-sectional view illustrating an aspect of elastic deformation of the outer blocking member when the cover is inserted in the first embodiment of the bearing device.

As illustrated in FIG. 4, the cover 11 is inserted into the one side opening 2B of the outer ring 2 from the axial end portion where the outer blocking member 11D is provided (see a white arrow). The outer blocking member 11D interferes with the support ring 8 because it is configured to have the inner diameter D6 smaller than the outer diameter of the cylindrical portion 8B of the support ring 8 supporting the magnetic encoder 7. However, as it is elastically deformed, it does not interfere with insertion of the cover 11 (see black arrows). As the radial seal portion 11E of the outer blocking member 11D has the outer diameter D1 (see FIG. 3) smaller than the outer diameter D2 (see FIG. 3) of the side portion 11A, when the side portion 11A is inserted into the one side opening 2B, it is not brought into contact with the side surface of the one side opening 2B. Therefore, the radial seal portion 11E does not generate a frictional force with the one side opening 2B when the cover 11 is inserted nor is damaged by the contact.

Figure 5:
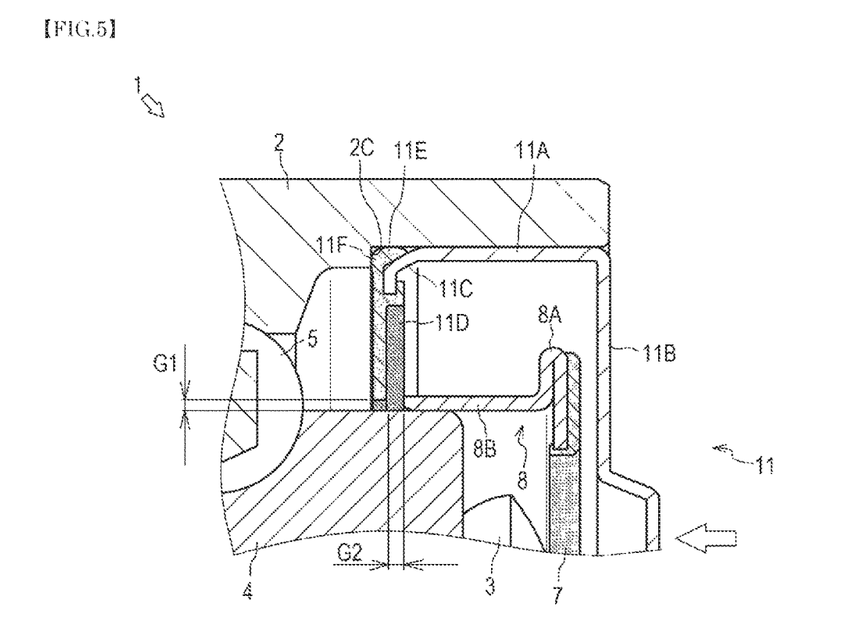
FIG. 5 is an enlarged cross-sectional view illustrating a state where the cover is fitted to a predetermined position in the first embodiment of the bearing device.

As illustrated in FIG. 5, the cover 11 is fitted to a predetermined position when the axial end portion of the side portion 11A makes contact with the stepped portion 2C of the one side opening 2B. The axial seal portion 11F of the outer blocking member 11D is pressed against the stepped portion 2C by an external force at the time of fitting. As a result, the radial seal portion 11E integrally formed with the axial seal portion 11F is elastically deformed radially outward from a state of being radially inside from the outer peripheral surface of the side portion 11A, and is pressed against the side surface of the one side opening 2B. That is, when the cover 11 is fitted to the predetermined position of the one side opening 2B, the radial seal portion 11E and the axial seal portion 11F are pressed against the one side opening 2B and the stepped portion 2C, respectively, thereby closing the gap between the one side opening 2B and the cover 11.

When the cover 11 is fitted to the predetermined position of the one side opening 2B of the outer ring 2, the outer blocking member 11D is provided between the ball row 5 and the axial end of the cylindrical portion 8B of the support ring 8 in the vicinity of the axial end of the cylindrical portion 8B of the support ring 8. As a result, the space in the vicinity of the ball row 5 into which the grease GR is injected becomes smaller. Further, the outer blocking member 11D is configured to have an inner diameter D6 (see FIG. 3) that is smaller than the outer diameter D3 (see FIG. 3) of the cylindrical portion 8B of the support ring 8 and is larger than the outer diameter D4 (see FIG. 3) of the inner ring 4. That is, the outer blocking member 11D is disposed between the ball row 5 and the magnetic encoder 7 in a state where all of the gaps G1 between the inner diameter side end thereof and the outer peripheral surface of the inner ring 4 (hereinafter simply referred to as a "gap G1 with the inner ring 4") overlap the end face of the cylindrical portion 8B of the support ring 8 when seen axially. With such an arrangement, the outer blocking member 11D is configured such that a passage resistance is generated not only in the gap G1 with the inner ring 4, but also in a gap G2 between the side surface of the outer blocking member 11D and the axial end of the cylindrical portion 8B of the support ring 8 (hereinafter simply referred to as a "gap G2 with the support ring 8").

Figure 6:
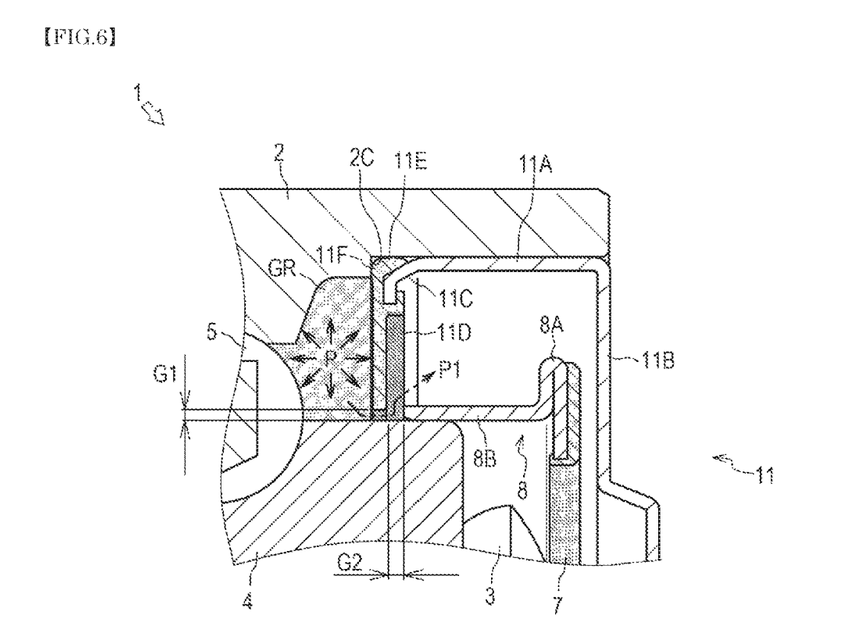
FIG. 6 is an enlarged cross-sectional view illustrating a state where lubricant is scraped out to a magnetic encoder side in the first embodiment of the bearing device.

As illustrated in FIG. 6, when the grease GR injected in the vicinity of the ball row 5 is scraped out by rolling of the ball row 5, the grease GR scraped out to the cover 11 side (magnetic encoder 7 side) is blocked by the outer blocking member 11D. To the grease GR blocked by the outer blocking member 11D, scraping pressure P caused by rolling of the ball row 5 is applied. The grease GR is pushed out toward a space where resistance during flowing is smaller by the scraping pressure P. At that time, when the scraping pressure P applied to the grease GR is smaller than pressure P1 (see the two-dot chain line arrow) necessary for the grease GR to pass through the gap G1 with the inner ring 4 of the outer blocking member 11D and the gap G2 with the support ring 8, the grease GR cannot pass through the gap G1 and the gap G2. Therefore, when the gap G1 and the gap G2 are equal to or smaller than a predetermined value, the grease GR is held in the vicinity of the ball row 5 without passing through the respective gaps.

In the bearing device 1 configured as described above, with the outer blocking member 11D made of synthetic rubber provided at the axial end of the side portion 11A of the cover 11, the injection amount of the grease GR is suppressed, and further, even if the grease GR is scraped out from the vicinity of the ball row 5 to the cover 11 side by rolling of the ball row 5, it is blocked by the outer blocking member 11D. Further, in the bearing device 1, the outer blocking member 11D is configured such that the pressure P1 required for the grease GR to pass through the gap G1 with the inner ring 4 of the outer blocking member 11D and the gap G2 with the support ring 8 is larger than the scraping pressure P of the ball row 5. Thereby, the grease GR is held in the vicinity of the ball row 5. As a result, the outflow of the grease GR from the vicinity of the ball row 5 to the magnetic encoder 7 side can be suppressed, and the enclosed amount of the grease GR can be reduced.

Figure 7:
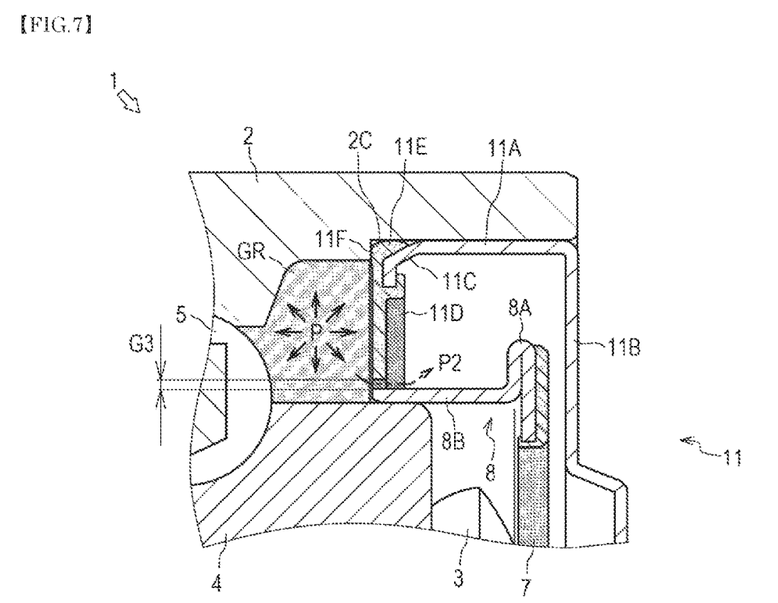
FIG. 7 is an enlarged cross-sectional view illustrating a state where lubricant is scraped out to the magnetic encoder side in an embodiment in which the position of the outer blocking member in the first embodiment of the bearing device is different.

As another embodiment of the present embodiment, the outer blocking member 11D may be disposed on the outer peripheral surface of the cylindrical portion 8B of the support ring 8 to thereby form a gap G3 with the outer peripheral surface of the cylindrical portion 8B, as illustrated in FIG. 7. At that time, the outer blocking member 11D is configured such that the pressure P2 (see the two-dot chain line arrow) required for the grease GR to pass through the gap G3 with the outer circumferential surface of the cylindrical portion 8B is larger than the scraping pressure P.

Next, with reference to FIGS. 8 and 9, description will be given on a bearing device for a vehicle wheel 12 that is a second embodiment of a bearing device for a vehicle wheel. It should be noted that the bearing device 12 according to the embodiment described below is applied, in place of the bearing device 1, in the bearing device 1 illustrated in FIGS. 1 to 7. The names, reference numerals, and symbols used in the description of the bearing device 1 are also used to refer to the same components. In the following embodiment, the detailed description of the same points as those of the aforementioned embodiment will be omitted, and the differences will be mainly described.

Figure 8:
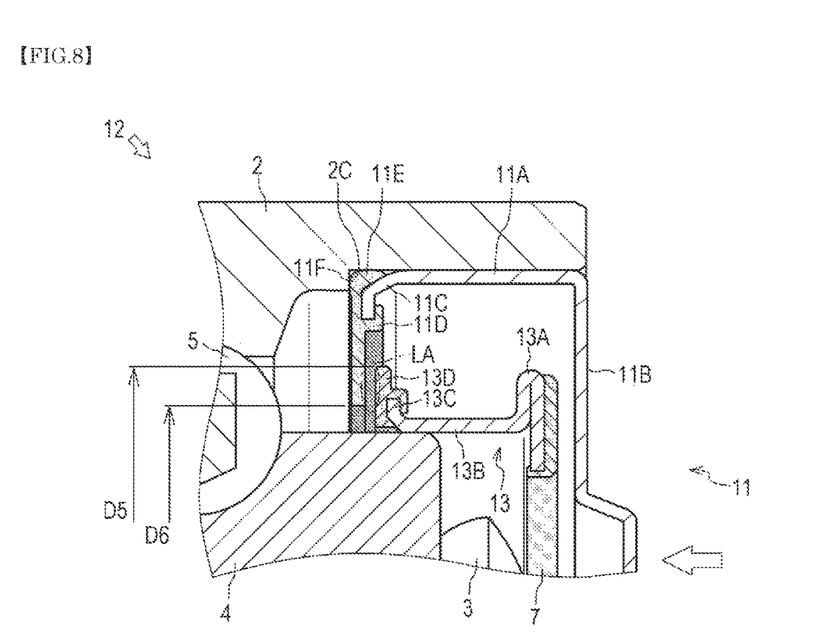
FIG. 8 is an enlarged cross-sectional view illustrating an outer blocking member and an inner blocking member according to a second embodiment of the bearing device.

As illustrated in FIG. 8, a support ring 13 supports the magnetic encoder 7. The support ring 13 is a cylindrical member in which a flange portion 13A is formed at one side end portion. The magnetic encoder 7 is integrally joined to the flange portion 13A of the support ring 13 by vulcanization adhesion. The cylindrical portion 13B of the support ring 13 is fitted to the inner ring 4 as a fitting portion. An axial end portion of the cylindrical portion 13B has an inner adhesion portion 13C bent radially outward over the entire circumference. To the inner adhesion portion 13C, an annular inner blocking member 13D made of a synthetic rubber plate such as a nitrile rubber that is an elastic body is integrally formed by vulcanization adhesion. The inner blocking member 13D is provided so as to extend radially outward from the entire circumference of the inner adhesion portion 13C. The inner blocking member 13D is formed such that an outer diameter D5 thereof is larger than the inner diameter D6 of the outer blocking member 11D of the cover 11. When the support ring 13 is fitted to a predetermined position of the inner ring 4, the inner blocking member 13D is disposed in the vicinity of the ball row 5.

Next, with reference to FIGS. 8 and 9, the relationship between the outer blocking member 11D of the cover 11 and the inner blocking member 13D of the support ring 13 will be described in detail.

As illustrated in FIG. 8, the cover 11 is inserted to the one side opening 2B of the outer ring 2 from the axial end portion of the side portion 11A where the outer blocking member 11D is provided (see a white arrow). The outer blocking member 11D interferes with the inner blocking member 13D because it has the inner diameter D6 smaller than the outer diameter D5 of the inner blocking member 13D of the support ring 13. However, as they are elastically deformed, outer blocking member 11D does not interfere with insertion of the cover 11.

When the cover 11 is fitted to a predetermined position of the one side opening 2B of the outer ring 2, the outer blocking member 11D is disposed between the ball row 5 and the inner blocking member 13D of the support ring 13 in the vicinity of the inner blocking member 13D. Further, as the inner diameter D6 of the outer blocking member 11D is smaller than the outer diameter D5 of the inner blocking member 13D, all of the gaps with the inner ring 4 are configured so as to overlap the inner blocking member 13D when viewed axially. Further, a labyrinth LA is formed between the outer blocking member 11D and the inner blocking member 13D due to the close arrangement. With such an arrangement, the outer blocking member 11D is configured such that passage resistance is generated in the labyrinth LA between the outer blocking member 11D and the inner blocking member 13D.

Figure 9:
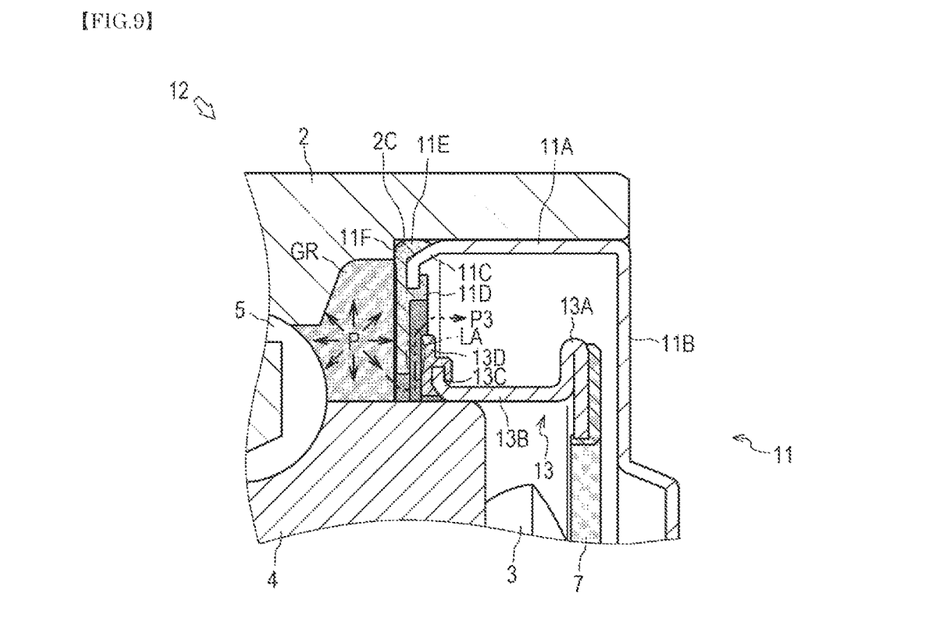
FIG. 9 is an enlarged cross-sectional view illustrating a state where lubricant is scraped out to a magnetic encoder side in the second embodiment of the bearing device.

As illustrated in FIG. 9, when the grease GR injected in the vicinity of the ball row 5 is scraped out by the rolling of the ball row 5, the grease GR (see an arrow) scraped out to the cover 11 side (magnetic encoder 7 side) is blocked by the outer blocking member 11D. To the grease GR blocked by the outer blocking member 11D, scraping pressure P caused by rolling of the ball row 5 is applied. The grease GR is pushed out toward a space where resistance during flowing is smaller by the scraping pressure P. At that time, when the scraping pressure P applied to the grease GR is smaller than pressure P3 (see the two-dot chain line arrow) necessary for the grease GR to pass through the labyrinth LA with the inner blocking member 13D, the grease GR cannot pass through the gap with the inner ring 4 of the outer blocking member 11D and the labyrinth LA with the inner blocking member 13D. Therefore, when the width and length of the labyrinth LA with the inner blocking member 13D are equal to or less than predetermined values, the grease GR is held in the vicinity of the ball row 5 without passing through the labyrinth LA.

In the bearing device 12 configured as described above, as the outer blocking member 11D and the inner blocking member 13D are configured such that the pressure P3 necessary for the grease GR to pass through the labyrinth LA defined by the inner blocking member 13D and the outer blocking member 11D is higher than the scraping pressure P of the ball row 5, the grease GR is held in the vicinity of the ball row 5. As a result, the outflow of the grease GR from the vicinity of the ball row 5 to the magnetic encoder 7 side can be suppressed, and the enclosed amount of the grease GR can be reduced.

Figure 10:
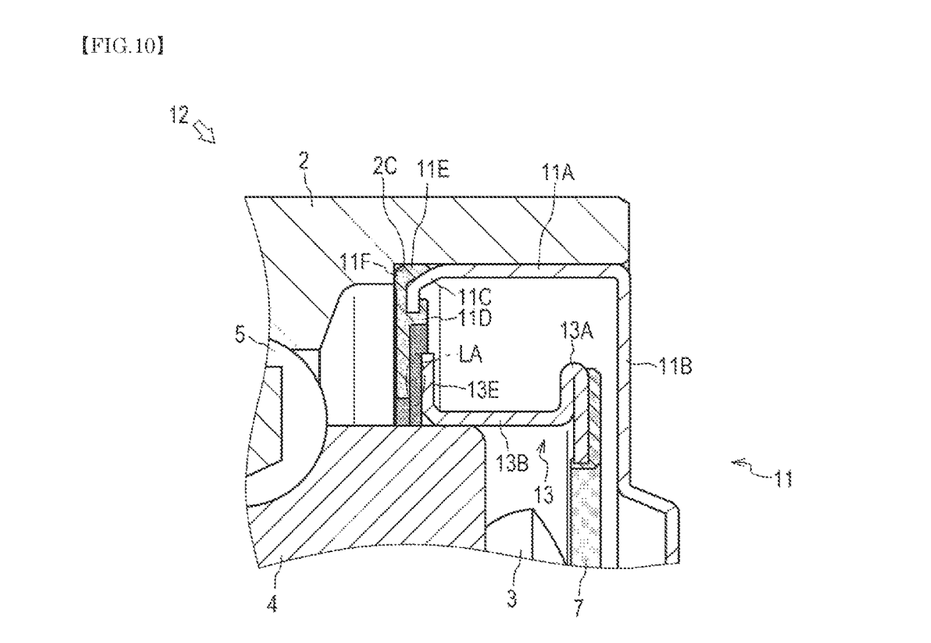
FIG. 10 is an enlarged cross-sectional view illustrating an embodiment in which the configuration of the inner blocking member in the second embodiment of the bearing device is different.

In the present embodiment, the inner blocking member 13D is described as being made of synthetic rubber. However, the present invention is not limited to this. As illustrated in FIG. 10, an inner blocking member 13E in which an end of the cylindrical portion 13B of the support ring 13 is bent radially outward may be used.

Although the bearing devices 1, 12 according to the present embodiments have been described as bearing device for a vehicle wheel of a third generation structure in which the inner rolling surface 3D of the ball row 5 is directly formed on the outer periphery of the hub wheel 3, the present invention is not limited thereto. For example, the bearing device may have a second generation structure of inner ring rotation in which a pair of inner rings 4 are press-fitted and fixed to the hub wheel 3. In addition, the above-described embodiments merely show representative forms of the present invention, and various modifications can be made without departing from the gist of the present invention.

INDUSTRIAL APPLICABILITY

The present invention is applicable to a bearing device for a vehicle wheel.

REFERENCE SIGNS LIST 1 bearing device for a vehicle wheel
2 outer ring
2B one side opening
3 hub wheel
4 inner ring
5 ball row
7 magnetic encoder
10 seal member
11 cover
11A side portion
11D outer blocking member
GR grease

The invention claimed is:

1. A bearing device for a vehicle wheel comprising:
an outer member in which double-row outer rolling surfaces are integrally formed on an inner periphery of the outer member;
an inner member including a hub wheel and at least one inner ring and having double-row inner rolling surfaces facing the double-row outer rolling surfaces on an outer periphery of the inner member, the hub wheel having a wheel mounting flange integrally formed for attaching a wheel at one end of the hub wheel and having a small diameter stepped portion extending axially on an outer periphery of the hub wheel, the inner ring being press-fitted to the small diameter stepped portion of the hub wheel;
double-row rolling elements rotatably accommodated between a rolling surface of the inner member and a rolling surface of the outer member;
a magnetic encoder provided at an end on an inner side of the inner member; and
a bottomed cylindrical cover fitted to an opening on an inner side of the outer member so as to face the magnetic encoder, wherein
the bearing device includes an outer blocking member formed of an annular elastic body extending radially inward at a side portion of the cover so as to retain a lubricant enclosed between the outer member and the inner member in vicinity of the rolling elements.

2. The bearing device according to claim 1, wherein in order to retain the lubricant enclosed between the outer member and the inner member in the vicinity of the rolling elements, an inner blocking member is provided to face the outer blocking member, the inner blocking member being in an annular shape and extending radially outward from an entire periphery of an end portion of the fitting portion of the support ring.

3. The bearing device according to claim 2, wherein the inner blocking member is formed of an annular elastic body extending radially outward from the end portion of the fitting portion of the support ring.

4. The bearing device according to claim 2, wherein the inner blocking member is formed such that the end portion of the fitting portion of the support ring is bent radially outward.

5. The bearing device according to claim 1, wherein the outer blocking member is provided on an axial end face of the side portion of the cover radially inside relative to an outer peripheral surface of the side portion, and a contact portion with the outer member is formed to protrude axially.

6. The bearing device according to claim 5, wherein in order to retain the lubricant enclosed between the outer member and the inner member in the vicinity of the rolling elements, an inner blocking member is provided to face the outer blocking member, the inner blocking member being in an annular shape and extending radially outward from an entire periphery of an end portion of the fitting portion of the support ring.

7. The bearing device according to claim 6, wherein the inner blocking member is formed of an annular elastic body extending radially outward from the end portion of the fitting portion of the support ring.

8. The bearing device according to claim 6, wherein the inner blocking member is formed such that the end portion of the fitting portion of the support ring is bent radially outward.

9. The bearing device according to claim 1, wherein the outer blocking member is configured to overlap a fitting portion of a support ring in an axial view, the support ring being fitted to an end portion on the inner side of the inner member and supporting the magnetic encoder.

10. The bearing device according to claim 9, wherein in order to retain the lubricant enclosed between the outer member and the inner member in the vicinity of the rolling elements, an inner blocking member is provided to face the outer blocking member, the inner blocking member being in an annular shape and extending radially outward from an entire periphery of an end portion of the fitting portion of the support ring.

11. The bearing device according to claim 10, wherein the inner blocking member is formed of an annular elastic body extending radially outward from the end portion of the fitting portion of the support ring.

12. The bearing device according to claim 10, wherein the inner blocking member is formed such that the end portion of the fitting portion of the support ring is bent radially outward.

13. The bearing device according to claim 5, wherein the outer blocking member is configured to overlap a fitting portion of a support ring in an axial view, the support ring being fitted to an end portion on the inner side of the inner member and supporting the magnetic encoder.

14. The bearing device according to claim 13, wherein in order to retain the lubricant enclosed between the outer member and the inner member in the vicinity of the rolling elements, an inner blocking member is provided to face the outer blocking member, the inner blocking member being in an annular shape and extending radially outward from an entire periphery of an end portion of the fitting portion of the support ring.

15. The bearing device according to claim 14, wherein the inner blocking member is formed of an annular elastic body extending radially outward from the end portion of the fitting portion of the support ring.

16. The bearing device according to claim 14, wherein the inner blocking member is formed such that the end portion of the fitting portion of the support ring is bent radially outward.

* * * * *